United States Patent
Zhang et al.

(10) Patent No.: US 11,965,610 B2
(45) Date of Patent: Apr. 23, 2024

(54) ELECTRIC VALVE AND ASSEMBLY METHOD THEREFOR

(71) Applicant: ZHEJIANG SANHUA AUTOMOTIVE COMPONENTS CO., LTD., Zhejiang (CN)

(72) Inventors: Xingkui Zhang, Zhejiang (CN); Wei Zhang, Zhejiang (CN); Yunzhi Lan, Zhejiang (CN); Zhenshan Zhu, Zhejiang (CN)

(73) Assignee: ZHEJIANG SANHUA AUTOMOTIVE COMPONENTS CO. LTD., Zhejiang (CN)

( * ) Notice: Subject to any disclaimer, the term of this patent is extended or adjusted under 35 U.S.C. 154(b) by 48 days.

(21) Appl. No.: 17/915,160

(22) PCT Filed: Mar. 23, 2021

(86) PCT No.: PCT/CN2021/082237
§ 371 (c)(1),
(2) Date: Sep. 28, 2022

(87) PCT Pub. No.: WO2021/197117
PCT Pub. Date: Oct. 7, 2021

(65) Prior Publication Data
US 2023/0120698 A1    Apr. 20, 2023

(30) Foreign Application Priority Data

Mar. 30, 2020 (CN) .......................... 202010237881.4
Nov. 4, 2020 (CN) .......................... 202011212829.X

(51) Int. Cl.
*F16K 5/06* (2006.01)
*F16K 5/08* (2006.01)
(Continued)

(52) U.S. Cl.
CPC .......... *F16K 5/0694* (2013.01); *F16K 5/0647* (2013.01); *F16K 5/08* (2013.01); *F16K 27/067* (2013.01); *F16K 41/046* (2013.01)

(58) Field of Classification Search
CPC ........ F16K 5/0694; F16K 5/0647; F16K 5/08; F16K 27/067; F16K 41/046; F16K 5/227;
(Continued)

(56) References Cited

U.S. PATENT DOCUMENTS 4,260,131 A * 4/1981 Kindersley ........... F16K 5/0626
251/315.1
5,445,248 A * 8/1995 Clarke ...................... F02D 9/06
251/305

(Continued)

FOREIGN PATENT DOCUMENTS

| CN | 205745579 U | 11/2016 |
|---|---|---|
| CN | 108730553 A | 11/2018 |
| JP | 2000337550 A | 12/2000 |

OTHER PUBLICATIONS

International Search Report dated Jun. 10, 2021 for PCT Appl. No. PCT/CN2021/082237.

*Primary Examiner* — John Bastianelli
(74) *Attorney, Agent, or Firm* — Ohlandt, Greeley and Perle, LLP

(57) ABSTRACT

An electric valve and an assembly method therefor. The provision of multilayered sealing of a first sealing element, a second sealing element, and a sealing medium located between the first sealing element and the second sealing element along the axial direction of a valve stem is conducive to restricting outward leakage of a fluid along the axial direction of the valve stem.

20 Claims, 11 Drawing Sheets

(51) Int. Cl.
*F16K 27/06* (2006.01)
*F16K 41/04* (2006.01)

(58) Field of Classification Search
CPC .......... F16K 41/003; F16K 5/06; F16K 27/08;
F16K 31/02; F16K 41/04; F16K 41/06;
F16K 41/063
USPC ...................................... 251/214, 304–317.1
See application file for complete search history.

(56) References Cited

U.S. PATENT DOCUMENTS

| | | | | |
|---|---|---|---|---|
| 6,167,900 | B1* | 1/2001 | Laird | B60C 23/0496 |
| | | | | 137/227 |
| 8,662,099 | B2* | 3/2014 | Arnold | F16K 37/0058 |
| | | | | 251/305 |
| 2010/0276624 | A1* | 11/2010 | Holpuch | F16K 27/067 |
| | | | | 251/357 |

* cited by examiner

ELECTRIC VALVE AND ASSEMBLY METHOD THEREFOR

This application is the national phase of International Patent Application No. PCT/CN2021/082237, titled "ELECTRIC VALVE AND ASSEMBLY METHOD THEREFOR", filed on Mar. 23, 2021, which claims the benefit of priorities to the following two Chinese patent applications, all of which are incorporated herein by reference,
1) Chinese Patent Application No. 202010237881.4, titled "ELECTRIC VALVE", filed with the China National Intellectual Property Administration on Mar. 30, 2020; and
2) Chinese Patent Application No. 202011212829.X, titled "ELECTRIC VALVE AND ASSEMBLY METHOD THEREFOR", filed with the China National Intellectual Property Administration on Nov. 4, 2020.

FIELD

The present application relates to an electric valve and an assembly method therefor.

BACKGROUND

An electric valve is generally used for circulation or switching of fluid in a system pipeline. The electric valve includes a control device, a valve stem, a valve body assembly and a valve core, the valve core is located in an inner chamber formed by the valve body assembly, and the control device drives the valve core to rotate via the valve stem, so as to control the circulation and switching of the fluid. During the operation of the electric valve, the fluid may leak outward along an axial direction of the valve stem. Therefore, how to limit the axial leakage of the fluid, especially a high-pressure fluid, is a technical problem.

SUMMARY

An object according to the present application is to provide an electric valve and an assembly method therefor, which is beneficial to preventing a fluid from leaking outward along an axial direction of a valve stem.

To achieve the above object, the following technical solutions are provided in the present application:
an electric valve includes a valve stem, a first sealing groove, a second sealing groove, a first sealing member and a second sealing member, part of the first sealing member is located in a first groove chamber formed by the first sealing groove, the first sealing member is pressed between the valve stem and the first sealing groove, part of the second sealing member is located in a second groove chamber formed by the second sealing groove, and the second sealing member is pressed between the valve stem and the second sealing groove, wherein the electric valve further includes a plunger, the valve stem includes an accommodating chamber and a first through hole, the first through hole extends through the valve stem, the first through hole is in communication with the accommodating chamber, at least part of the plunger is located in the accommodating chamber, the plunger is sealed to the valve stem, the first through hole is located between the first sealing member and the second sealing member, a sealing chamber is formed by the plunger, the valve stem, the first sealing groove, the second sealing groove, the first sealing member and the second sealing member, a sealing medium is filled in the sealing chamber, and part of the sealing medium is located between the first sealing member and the second sealing member.

An assembly method for an electric valve is provided, wherein the electric valve includes a dynamic sealing member and a valve stem, the dynamic sealing member includes a first end cover, a second end cover, a connecting seat, a first sealing member and a second sealing member, and the assembly method for the electric valve includes the following steps:

arranging the first sealing member in a first chamber of the connecting seat, arranging the second sealing member in a second chamber of the connecting seat, and press-fitting and fixing the first end cover and the second end cover respectively to the connecting seat assembled with the first sealing member and the second sealing member with interference; and assembling the valve stem with the dynamic sealing member in a sealing medium, and pushing the valve stem to pass through the dynamic sealing member, so that a first stem portion of the valve stem is higher than the first end cover, the first sealing member is pressed between a second stem portion of the valve stem and the connecting seat, and the second sealing member is pressed between the second stem portion of the valve stem and the connecting seat.

The electric valve and the assembly method therefor are provided according to the present application. Along the axial direction of the valve stem, the provision of multi-sealing of the first sealing member, the second sealing member and the sealing medium located between the first sealing member and the second sealing member is beneficial to preventing the fluid from leaking outward along the axial direction of the valve stem.

DETAILED DESCRIPTION OF THE EMBODIMENTS

The present application is further illustrated hereinafter in conjunction with drawings and specific embodiments.

Figure 1:
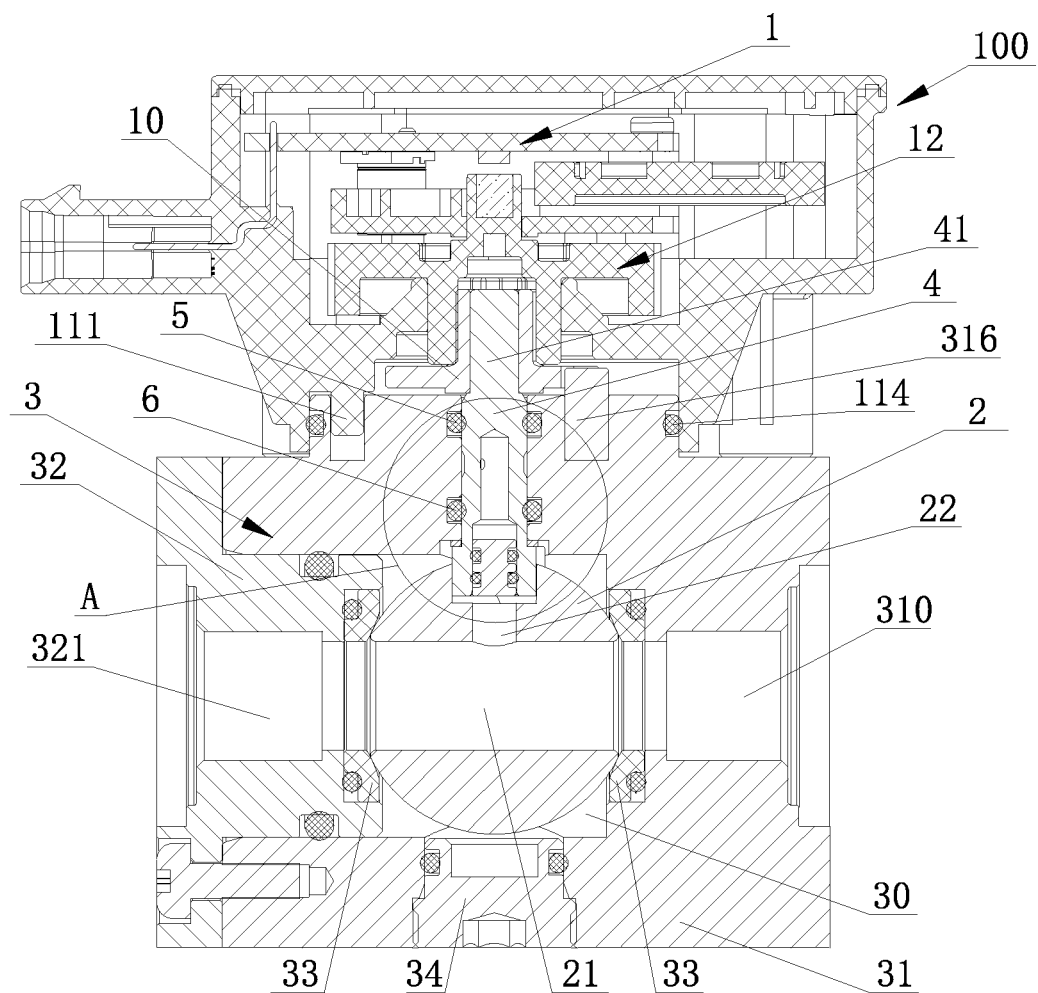
FIG. 1 is a schematic sectional view of a first embodiment of an electric valve.

Referring to FIG. 1, an electric valve is used in an air conditioning system of a vehicle. An electric valve 100 includes a driving member 1, a valve core 2, a valve body assembly 3 and a valve stem 4. The valve core 2 is located in a valve body chamber 30 formed by the valve body assembly 3, one end of the valve stem 4 is transmissively connected with the driving member 1, another end of the valve stem 4 is transmissively connected with the valve core 2, the driving member 1 outputs a torque to the valve stem 4, and the valve stem 4 drives the valve core 2 to rotate. In this embodiment, the valve core 2 is spherical, the electric valve 100 further includes a transmission member 12 which may be a gear reduction mechanism, at least part of the transmission member 12 is located in the driving member 1, the driving member 1 is transmissively connected with the transmission member 12, the transmission member 12 is transmissively connected with the valve stem 4, and the driving member 1 drives the valve stem 4 to move via the transmission member 12.

Referring to FIG. 1, the valve body assembly 3 includes a valve body 31, a sealing cover 32, a valve core seat 33 and a plug 34, the sealing cover 32 is fixedly connected to the valve body 31, the plug 34 is fixedly connected to the valve body 31, the valve body 31, the sealing cover 32 and the plug 34 are assembled to form the valve body chamber 30, the valve core 2 is located in the valve body chamber 30, the valve core seat 33 is located on two sides of the valve core 2, the valve core seat 33 is provided with an arc-shaped surface matched with an outer surface of the valve core 2, at least part of the arc-shaped surface of the valve core seat 33 closely abuts against the outer surface of the valve core 2, the valve core 4 is slidable relative to the valve core seat 33, and the valve core seat 33 can support and seal the valve core 2. Furthermore, the sealing cover 32 may be sealed to the valve body 31, which is beneficial to prevent working fluid from leaking outward from an assembly gap between the sealing cover 32 and the valve body 31. The plug 34 may be sealed to the valve body 31, which is beneficial to prevent the working fluid from leaking outward from an assembly gap between the plug 34 and the valve body 31. The valve core seat 33 may be sealed to the sealing cover 32, and/or the valve core seat 33 may be sealed to the valve body 31, which is beneficial to preventing the working fluid from leaking inward from a passage to the valve body chamber 30 and/or from leaking inward from the valve body chamber 30 to the passage, and is beneficial to improving the control accuracy of flow. In this embodiment, the valve body 31 includes a first passage 310, the sealing cover 32 includes a second passage 321, the valve core 2 includes a hole passage 21, the hole passage 21 extends through the valve core 2, and the first passage 310 may be in communication with the second passage 321 or not through the hole passage 21 by rotating the valve core 2, so as to control the circulation of the fluid. It should be noted that the electric valve 100 is not limited to the two-way valve in FIG. 1, and the electric valve 100 may be a three-way valve, a four-way valve or other multi-way valve.

Figure 2:
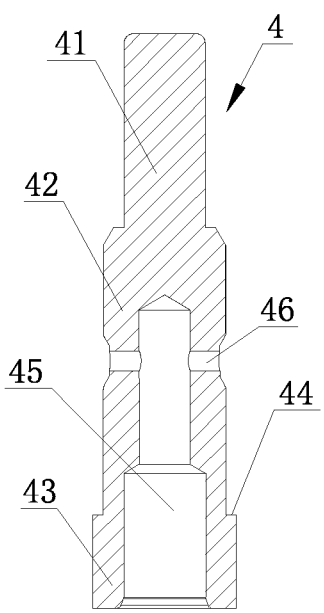
FIG. 2 is a schematic sectional view of a valve stem in FIG. 1.

Referring to FIG. 2, the valve stem 4 includes a first stem portion 41, a second stem portion 42 and a connecting portion 43, the connecting portion 43 is a non-rotating body, the second stem portion 42 is located between the first stem portion 41 and the connecting portion 43 along an axial direction of the valve stem 4, and the connecting portion 43 protrudes from the second stem portion 41 along a radial direction of the valve stem 4, that is, the connecting portion 43 includes a first flange portion 44. The valve stem 4 further includes an accommodating chamber 45 and a first through hole 46, the first through hole 46 extends through the valve stem 4, the accommodating chamber 45 is in communication with the first through hole 46, the first through hole 46 is arranged in the second stem portion 42, and an opening of the accommodating chamber 45 is located on a free end surface of the connecting portion 43.

Figure 3:
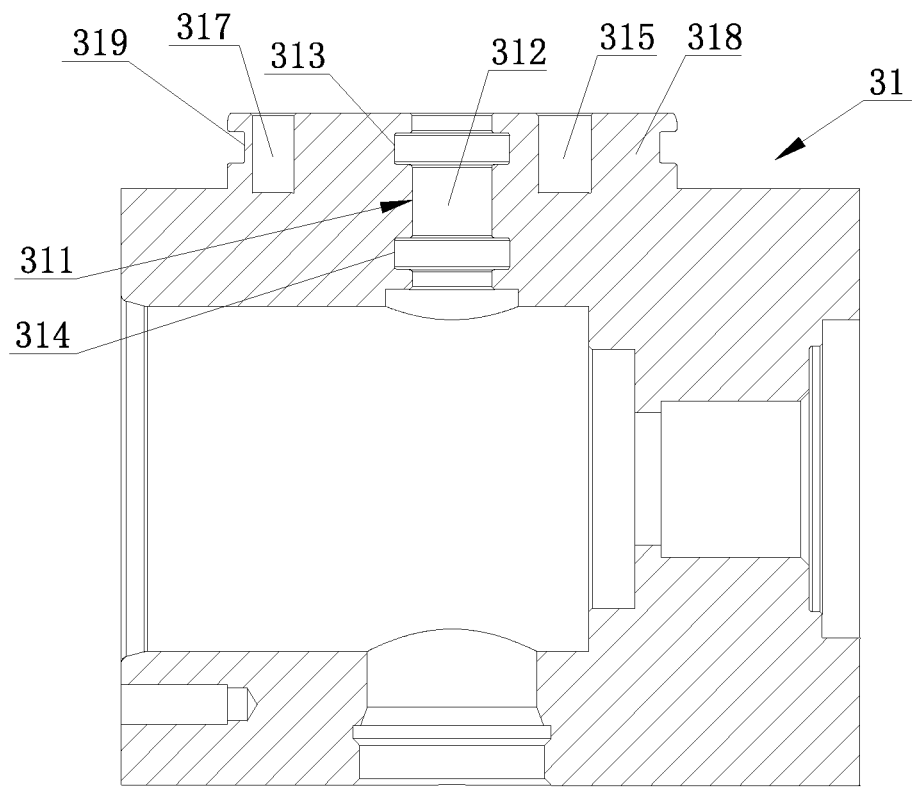
FIG. 3 is a schematic sectional view of a valve body in FIG. 1.

Referring to FIG. 3, the valve body 31 includes a first mounting portion 311, a first mounting chamber 312 is defined by the first mounting portion 311, the first mounting portion 311 includes a first sealing groove 313 and a second sealing groove 314, the first sealing groove 311 and the second sealing groove 314 are respectively formed by a side wall of the first mounting portion 311 recessed inwardly along a radial direction of the first mounting chamber 312, and the first sealing groove 313 is closer to an outer opening of the first mounting portion 311 than the second sealing groove 314 along an axial direction of the first mounting chamber 312.

Figure 4:
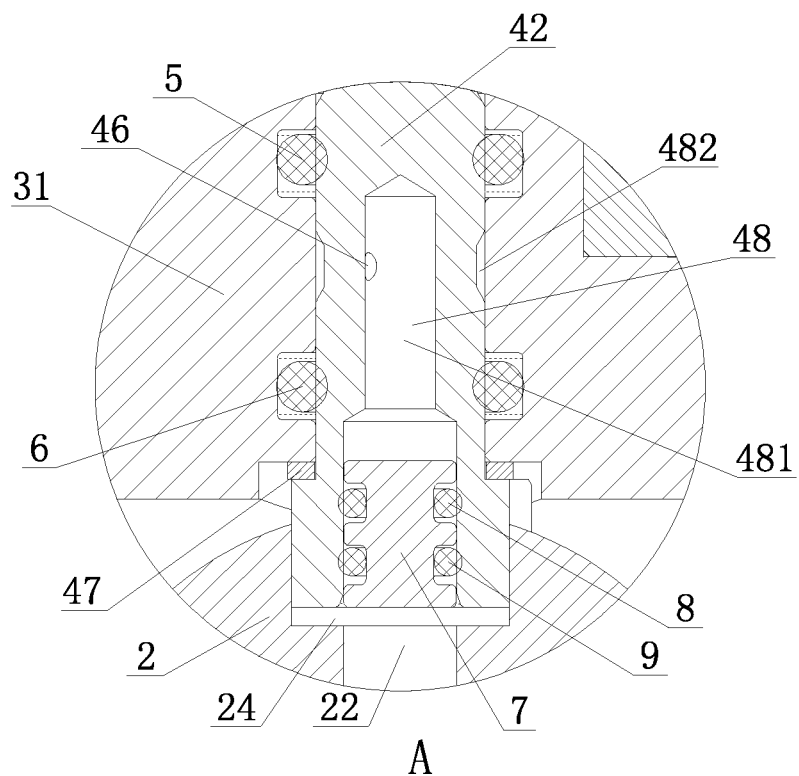
FIG. 4 is a schematic partial enlarged sectional view of portion A in FIG. 1.

Referring to FIG. 1 and FIG. 4, part of the valve stem 4 is located in the first mounting chamber 312. Specifically, at least part of the second stem portion 42 of the valve stem 4 is located in the first mounting chamber 312, the connecting portion 43 is located in the valve body chamber 30, and the first flange portion 44 can be limited to the valve body 31, so that the connecting portion 43 is axially limited by the first flange portion 44, and the connecting portion 43 is transmissively connected with the valve core 2. Since the first flange portion 44 is limited to the valve body 31, the provision of the plug 34 facilitates the mounting of the valve stem 4. Furthermore, in order to reduce the friction loss of the connecting portion 43 during the rotation following the valve stem 4, a gasket 47 may be added between the first flange portion 44 and the valve body 31, that is, the first flange portion 44 abuts against the gasket 47, the valve body 31 abuts against the gasket 47, and the gasket 47 is located between the first flange portion 44 and the valve body 31. The first stem portion 41 protrudes out from the outer opening of the first mounting portion 311. Referring to FIG. 4, the electric valve 100 further includes a first sealing member 5 and a second sealing member 6, part of the first sealing member 5 is located in a first groove chamber formed by the first sealing groove 313, an inner peripheral side of the first sealing member 5 protrudes from the first sealing groove 313, an outer peripheral side of the first sealing member 5 abuts against the first sealing groove 313, the inner peripheral side of the first sealing member 5 abuts against an outer peripheral wall of the second stem portion 42, and the first sealing member 5 is pressed between the first sealing groove 313 and the second stem portion 42. Similarly, part of the second sealing member 6 is located in a second groove chamber formed by the second sealing groove 314, and the second sealing member 6 is pressed between the second sealing groove 314 and the second stem portion 42. The first through hole 46 of the valve stem 4 is located between the first sealing member 5 and the second sealing member 6 along an axial direction of the valve stem 4. As other embodiments, the first sealing member 5 and the second sealing member 6 may be sleeved on a radial outer circumference of the second stem portion 42, and the first sealing member 5 and the second sealing member 6 are respectively pressed between the first mounting portion 311 and the second stem portion 42, that is, the first mounting portion 311 may not include the first sealing groove 313 and the second sealing groove 314; or the first sealing groove 313 and the second sealing groove 314 may be arranged on the second stem portion 42.

Figure 5:
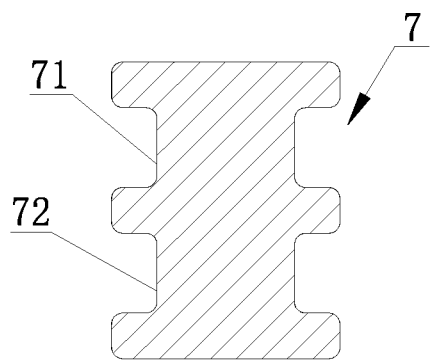
FIG. 5 is a schematic sectional view of a plunger in FIG. 1.

Referring to FIG. 1 and FIG. 4, in this embodiment, the electric valve 100 further includes a plunger 7, a third sealing member 8 and a fourth sealing member 9. Referring to FIG. 5, the plunger 7 includes a third sealing groove 71 and a fourth sealing groove 72, and the third sealing groove 71 and the fourth sealing groove 72 are respectively formed by an outer peripheral wall of the plunger 7 recessed inwardly along a radial direction of the plunger 7. Referring to FIG. 1 and FIG. 4, at least part of the plunger 7 is located in the accommodating chamber 45 of the valve stem 4, and the third sealing groove 71 is farther from the valve core 2 than the fourth sealing groove 72 along an axial direction of the plunger 7, part of the third sealing member 8 is located in a third groove chamber formed by the third sealing groove 71, an inner peripheral side of the third sealing member 8 abuts against the third sealing groove 71, an outer peripheral side of the third sealing member 8 protrudes from the third sealing groove 71, the outer peripheral side of the third sealing member 8 abuts against a side wall surface forming the accommodating chamber 45, and the third sealing member 8 is pressed between the third sealing groove 71 and the side wall surface forming the accommodating chamber 45. Similarly, part of the fourth sealing member 9 is located in a fourth groove chamber formed by the fourth sealing groove 72, and the fourth sealing member 9 is pressed between the fourth sealing groove 72 and the side wall surface forming the accommodating chamber 45. In this way, a sealing chamber 48 is formed between the plunger 7, the valve stem 4 and the valve body 31 under the action of the sealing members, the sealing chamber 48 includes a first portion 481 and a second portion 482, the first portion 481 includes an accommodating chamber portion defined by the plunger 7 sealed to the accommodating chamber 45, the second portion 482 includes an assembly gap portion enclosed between the second stem portion 42 of the valve stem 4 and the first mounting portion 311, and the second portion 482 is bounded by the first sealing member 5 and the second sealing member 6; the first portion 481 is in communication with the second portion 482 through the first through hole 46; sealing oil is filled in the sealing chamber 48. In this embodiment, the sealing oil is refrigerant oil. Alternatively, as other embodiments, the sealing oil may be other sealing medium. It should be noted that the selection of the sealing oil needs to be matched with the fluid medium flowing through the electric valve 100, which can avoid the pollution of the sealing oil to the working fluid. In addition, in this embodiment, the plunger 7 includes the third sealing groove 71 and the fourth sealing groove 72, and the plunger 7 is dual-sealed to the accommodating chamber 45 by the third sealing member 8 and the fourth sealing member 9, so as to ensure good sealing performance. As other embodiments, on the premise of ensuring the sealing, the plunger 7 may be sealed to the sealing chamber 48 by one sealing, that is, the plunger 7 may not include the fourth sealing groove 72, and the electric valve 100 may not include the fourth sealing member 9; or the third sealing member 8 and/or the fourth sealing member 9 are sleeved on a radial outer circumference of the plunger 7, the third sealing member and/or the fourth sealing member are pressed between the outer peripheral wall of the plunger 7 and the side wall surface forming the accommodating chamber 45, that is, the plunger 7 may not include the third sealing groove 71 and the fourth sealing groove 72.

Figure 6:
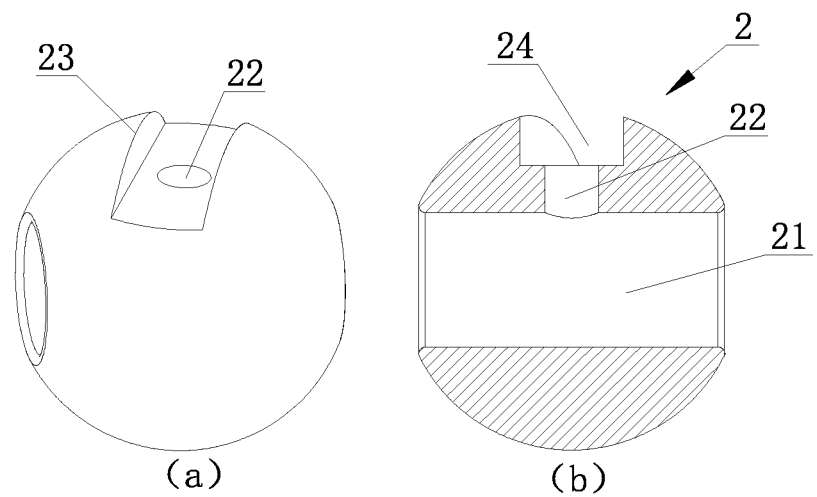
FIG. 6 is a schematic perspective view and a schematic sectional view of a valve core in FIG. 1.

Referring to FIG. 6, the valve core 2 further includes a second through hole 22 and a second mounting portion 23, a second mounting chamber 24 is formed by the second mounting portion 23, and the hole passage 21 is in communication with the second mounting chamber 24 through the second through hole 22. Referring to FIG. 1, the valve core 2 is located in the valve body chamber 30, at least part of the connecting portion 43 of the valve stem 4 is located in the second mounting chamber 24 of the valve core 2, and the valve stem 4 is transmissively connected with the valve core 2 via the connecting portion 43.

Referring to FIG. 1 and FIG. 4, part of the working fluid flowing through the hole passage 21 of the valve core, especially the high-pressure fluid, enters the valve body chamber 30 during the sliding fit between the valve core 2 and the valve core seat 33, and another part enters the second mounting chamber 24 through the second through hole 22, the working fluid located in the second mounting chamber 24 can act on a lower end surface of the plunger 7, and an end surface of the plunger 7 close to the valve core 2 is the lower end surface. Under the pressure of the working fluid, the plunger 7 can move away from the valve core 2 along the axial direction of the accommodating chamber 45. The movement of the plunger 7 may compress the sealing oil located in the first portion 481 of the sealing chamber 48, and the compressed sealing oil can more easily enter the second portion 482 of the sealing chamber 48 under the action of the first through hole 46, and can finally form a uniform and stable oil film for sealing in the second portion 482, so that the multi-sealing of the first sealing member 5, the second sealing member 6 and the sealing oil of the second portion 482 located between the first sealing member 5 and the second sealing member 6 is beneficial to preventing the fluid in the valve body chamber 30 from leaking outward along the axial direction of the valve stem 4. In this embodiment, referring to FIG. 2 and FIG. 4, a radial dimension of the second stem portion 42 at the first through hole 46 is less than a radial dimension of the second stem portion 42 at other portions, so that an assembly gap between the second stem portion 42 at the first through hole 46 and a side wall of the first mounting portion 311 is greater than an assembly gap between the second stem portion 42 at other portions and the first mounting portion 311 when the second stem portion 42 is located in the first mounting chamber 312, and an oil storage buffer zone can be formed at the first through hole 46, which is beneficial to forming a more stable and uniform oil film for sealing in the second portion 482 and to improving the sealing effect. As other embodiments, the radial dimension of the second stem portion 42 at the first through hole 46 may be equal to the radial dimension of the second stem portion 42 at other portions. On one hand, in the process of compressing the sealing oil, the pressure of the sealing oil and the pressure of the working fluid tend to balance gradually, the second sealing member 6, the third sealing member 8 and the fourth sealing member 9 are located between the working fluid and the sealing oil whose pressures tend to balance, so that an axial pressure of the fluid and the oil subjected by the second sealing member 6, the third sealing member 8 and the fourth sealing member 9 is small, which is beneficial to improving the sealing performance of the second sealing member 6, the third sealing member 8 and the fourth sealing member 9. On the other hand, due to the frequent rotation of the valve stem 4, there is friction loss of relative rotation between the valve stem 4 and the first sealing member 5 and relative rotation between the valve stem 4 and the second sealing member 6, the sealing oil can improve the lubrication of the relative movement between the valve stem 4 and the first sealing member 5 and of the relative movement between the valve stem 4 and the second sealing member 6, which is beneficial to reducing the friction loss, and to prolonging the service life of the first sealing member 5 and the second sealing member 6.

Figure 7:
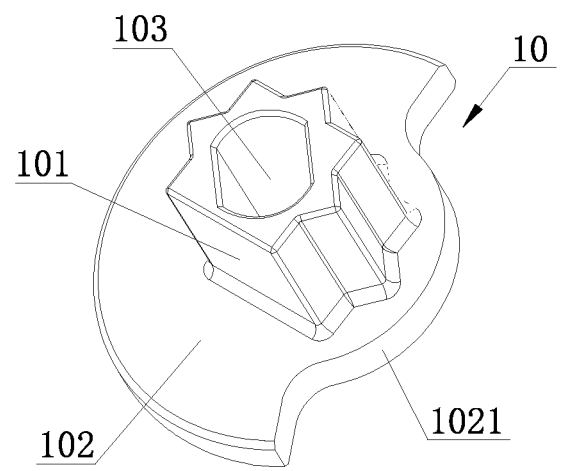
FIG. 7 is a schematic perspective view of a limiting frame in FIG. 1.

Referring to FIG. 7, the electric valve 100 further includes a limiting frame 10, the limiting frame 10 includes a cooperation portion 101, a stop portion 102 and a third through hole 103, the third through hole 103 extends through the limiting frame 10, the cooperation portion 101 is configured to be transmissively connected with the driving member 1 or the cooperation portion 101 is configured to be transmissively connected with the transmission member 12. In this embodiment, the cooperation portion 101 is a star-shaped structure, the star-shaped structure is beneficial to avoiding the rotation and sliding between the transmission member 12 and the cooperation portion 101. As other embodiments, the cooperation portion 101 may be a structure in other shapes with a limiting function. The stop portion 102 includes a stop section 1021, and the stop portion 102 limits a rotation angle of the valve stem 4 by the stop section 1021. Specifically, referring to FIG. 1 and FIG. 3, the valve body 31 includes a limiting hole 315, a limiting column 316 is in an interference fit with the limiting hole 315, and the limiting column 316 protrudes out from the limiting hole 315. As other embodiments, the limiting column 316 may be integrally processed and formed with the valve body 31. Referring to FIG. 1, the limiting frame 10 is sleeved on a radial outer circumference of the first stem portion 41 via the third through hole 103, the third through hole 103 is in an interference fit with the first stem portion 41, the limiting frame 10 is fixedly connected to the valve stem 4 via the first stem portion 41, the limiting frame 10 is transmissively connected with the transmission member 12, there is a gap between a lower end surface of the limiting frame 10 and the valve body 31, an end surface of the limiting frame 10 close to the valve core 2 is the lower end surface, and the provision of the gap is beneficial to reducing the friction loss when the limiting frame 10 rotates relative to the valve body 31. The driving member 1 drives the limiting frame 10 to rotate by means of a torque output by the transmission member 12, the limiting frame 10 drives the valve stem 4 to rotate, and the stop section 1021 of the stop portion 102 abuts against the limiting column 316 during the rotation of the limiting frame 10, so as to limit the rotation angle of the limiting frame 10 and further limit the rotation angle of the valve stem 4.

Figure 8:
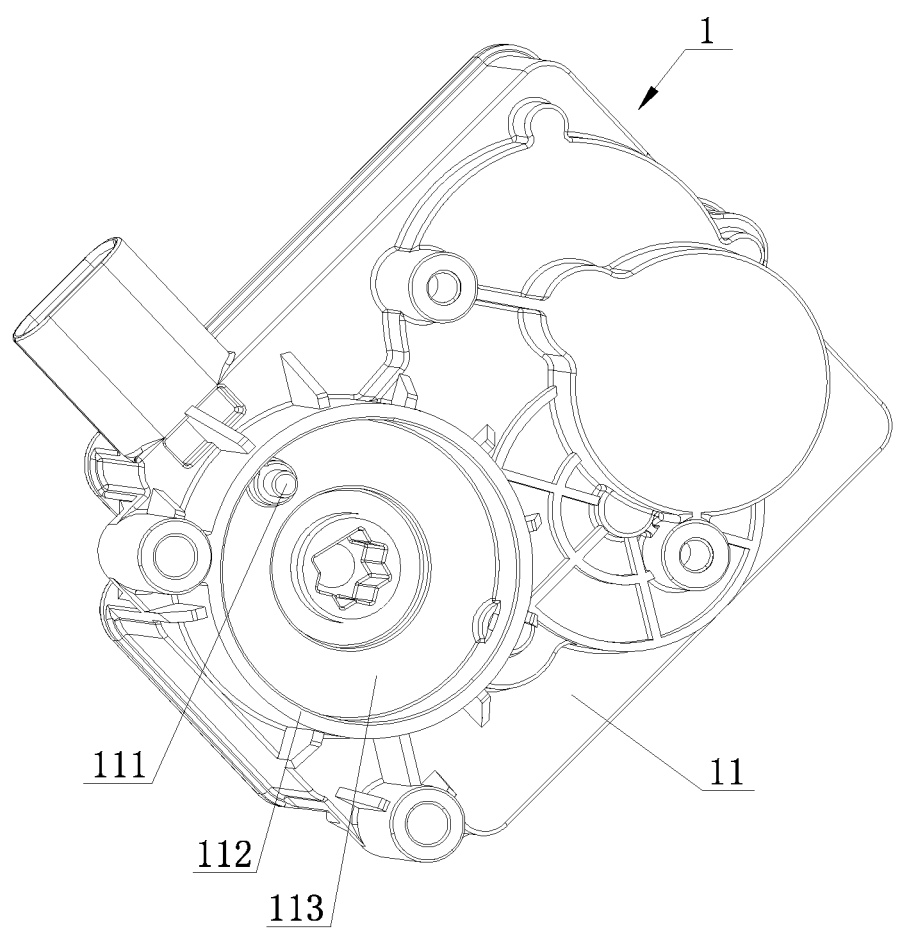
FIG. 8 is a schematic perspective view of a control device in FIG. 1.

The driving member 1 is connected to the valve body 31. Specifically, referring to FIG. 8, the driving member 1 includes a lower housing 11, which is integrally injection molded. The lower housing 11 includes a positioning column 111 and a third mounting portion 112, a third mounting chamber 113 is formed by the third mounting portion 112, and the positioning column 111 is located in the third mounting chamber 113. Correspondingly, referring to FIG. 3, the valve body 31 includes a positioning hole 317, the positioning hole 317 is arranged in a protruding portion 318 of the valve body 31, the positioning hole 317 is farther from the first mounting chamber 312 than the limiting hole 315, which is convenient to distinguish the positioning hole 317 and the limiting hole 315 during assembly, and prevents the limiting frame 10 from abutting against the positioning column 31 located in the positioning hole 317 during rotation. Referring to FIG. 1, when the driving member 1 is assembled with the valve body 31, at least part of the protruding portion 318 is located in the third mounting chamber 113, or the driving member 1 is sleeved on an outer circumference of the protruding portion 318 via the third mounting portion 112, at least part of the positioning column 111 is located in the positioning hole 317 of the valve body 31, so as to achieve the positioning of the driving member 1 and the valve body 31. The lower housing 11 is fixedly connected to the valve body 31. Furthermore, the lower housing 11 may be sealed to the valve body 31. Specifically, referring to FIG. 3, a fifth sealing groove 319 recessed inwardly along a radial direction of the protruding portion 318 is defined on the protruding portion 318 of the valve body 31. Referring to FIG. 1, the electric valve 100 further includes a fifth sealing member 114, part of the fifth sealing member 114 is located in a fifth groove chamber formed by the fifth sealing groove 319, the fifth sealing member 114 is pressed between the fifth sealing groove 319 and a side wall of the third mounting portion 112, the fifth sealing member 114 is in a sealed and pressed state, and the provision of the fifth sealing member 114 is beneficial to preventing the moisture or medium in the external environment from entering an interior of the driving member 1 and causing damage to a circuit board or other electronic components inside the driving member 1.

Figure 9:
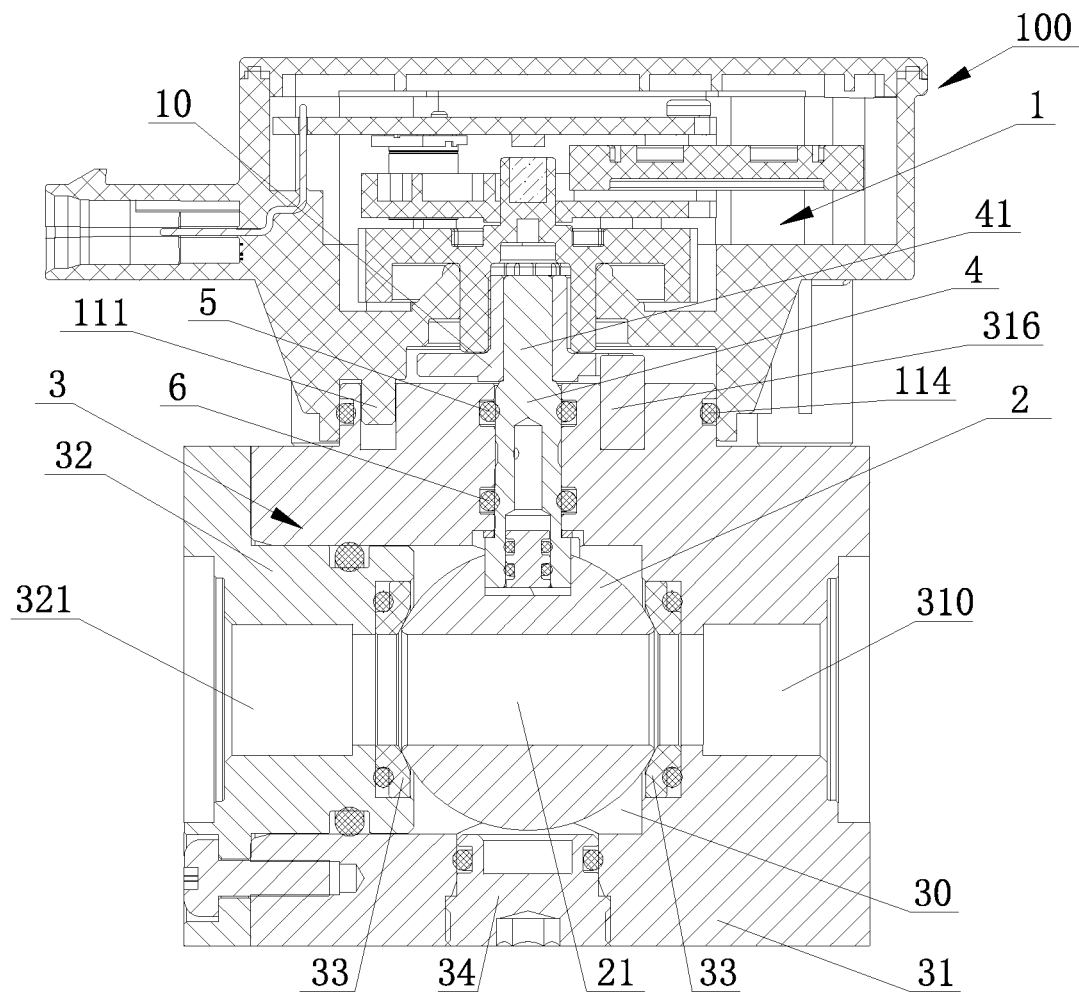
FIG. 9 is a schematic sectional view of a second embodiment of the electric valve.

Referring to FIG. 9, which is a second embodiment of the electric valve 100, a main difference between the technical solution of the second embodiment and the technical solution of the first embodiment is that: in the second embodiment, the valve core 2 may not include the second through hole 22, that is, the fluid does not act on the plunger 7 to further compress the sealing oil, and the valve stem 4 is axially sealed by the first sealing member 5, the second sealing member 6 and the oil of the second portion 482 located between the first sealing member 5 and the second sealing member 6.

Figure 10:
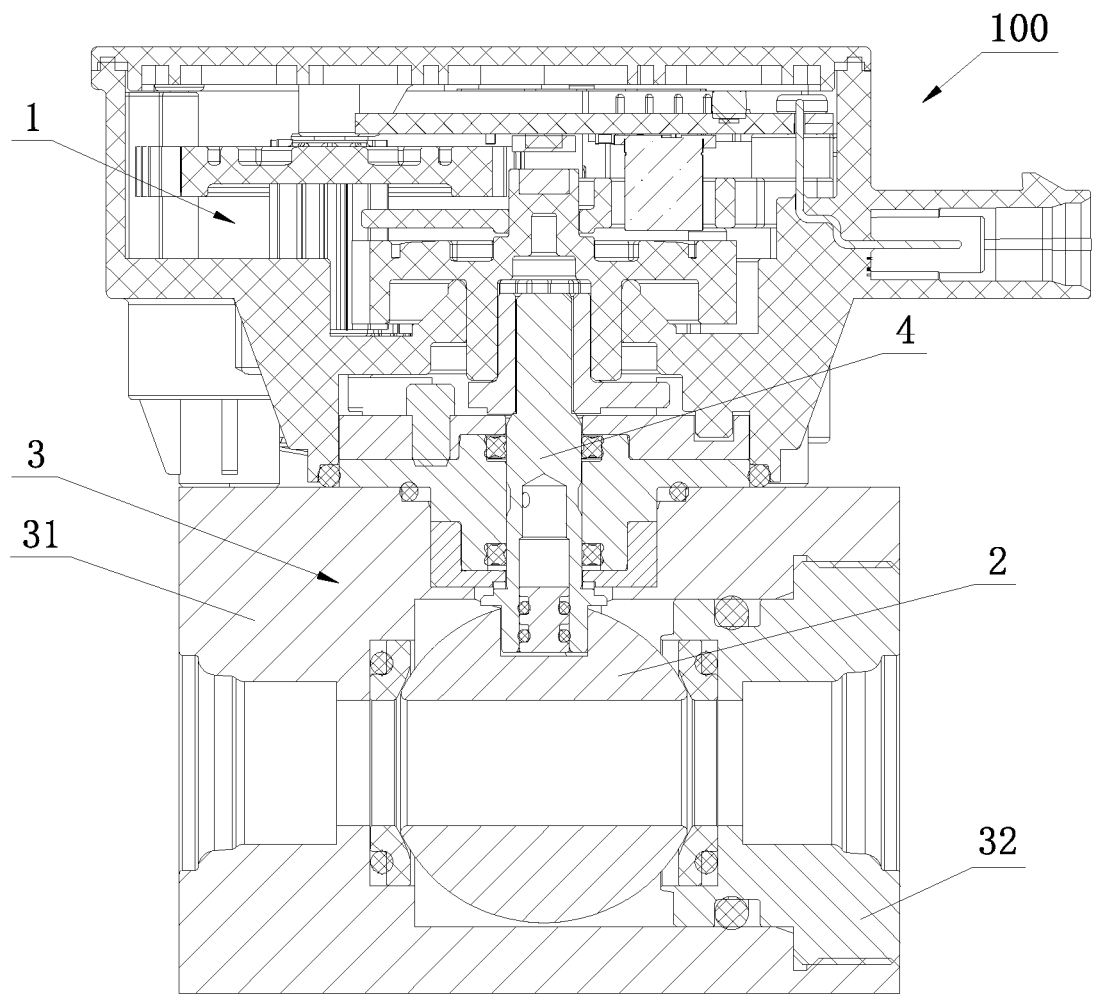
FIG. 10 is a schematic sectional view of a third embodiment of the electric valve.
Figure 11:
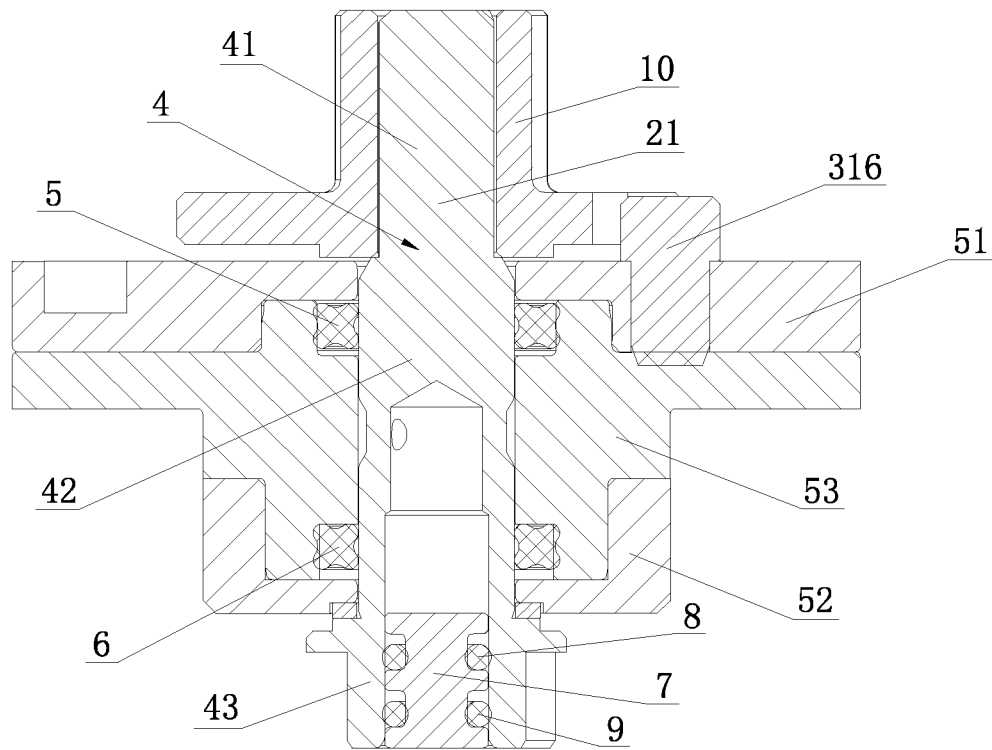
FIG. 11 is a schematic sectional view of a dynamic sealing member in FIG. 10.
Figure 12:
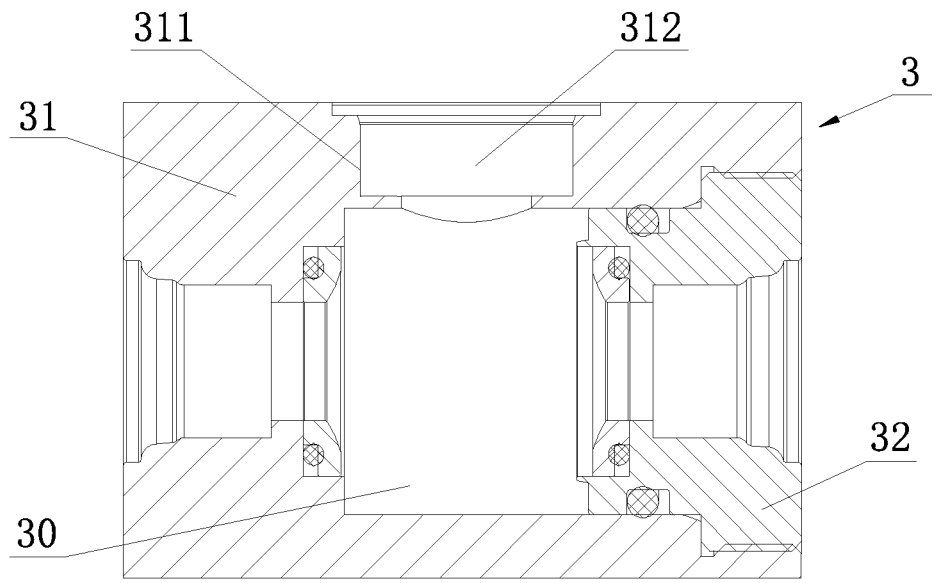
FIG. 12 is a schematic sectional view of a valve body assembly in FIG. 10.

Referring to FIGS. 10 to 12, which are a third embodiment of the electric valve 100, a main difference between the technical solution of the third embodiment and the technical solution of the second embodiment is that: in the third embodiment, an axial sealing portion of the valve stem 4 may be a dynamic sealing member independent of the valve stem 4, and the axial sealing portion is assembled and fixed with the valve body assembly 3, which simplifies the assembly of the electric valve. Specifically, the dynamic sealing member includes a first sealing member 5, a second sealing member 6, a first end cover 51, a second end cover 52, a connecting seat 53, a plunger 7, a third sealing member 8 and a fourth sealing member 9, the first end cover 51 is fixedly connected to the connecting seat 53, the second end cover 52 is fixedly connected to the connecting seat 53, the first end cover 51 is assembled with the connecting seat 53 to form a first sealing groove, and the second end cover 52 is assembled with the connecting seat 53 to form a second sealing groove. As other embodiments, it is conceivable that the first end cover 51, the second end cover 52 and the connecting seat 53 may be integrally processed and formed, the provision of split structures of the first end cover 51, the second end cover 52 and the connecting seat 53 facilitates the assembly of the first sealing member 5 and the second sealing member 6. The first end cover 51, the second end cover 52 and the connecting seat 53 are located on an outer circumference of the valve stem 4, which specifically may be located on an outer circumference of the second stem portion 42 of the valve stem 4. Along an axial direction of the valve stem 4, a first stem portion 41 of the valve stem 4 protrudes from the first end cover 51, the first stem portion 41 is fixedly connected to the limiting frame 10, and the limiting column 316 is assembled and fixed to or integrally processed and formed with the first end cover 51. During the rotation of the limiting frame 10, the stop portion 102 of the limiting frame 10 can abut against the limiting column 316, so as to limit the rotation angle of the valve stem 4. The connecting portion 43 of the valve stem 4 protrudes from the second end cover 52, the connecting portion 43 is axially limited by the second end cover 52, and the connecting portion 43 is transmissively connected with the valve core 2. Part of the first sealing member 5 is located in a first groove chamber formed by the first sealing groove, an outer peripheral side of the first sealing member 5 abuts against the first sealing groove, an inner peripheral side of the first sealing member 5 abuts against the second stem portion 42, the first sealing member 5 is pressed between the first sealing groove and the second stem portion 42, and the first sealing member 5 is in a sealed and pressed state. Similarly, part of the second sealing member 6 is located in a second groove chamber formed by the second sealing groove, the second sealing member 6 is pressed between the second sealing groove and the second stem portion 42, and the second sealing member 6 is in a sealed and pressed state. The plunger 7 is located in the accommodating chamber 45 of the valve stem 4, and the arrangement of assembly and sealing of the plunger 7, the third sealing member 8 and the fourth sealing member 9 with the valve stem 4 is the same as that of the second embodiment, which will not be repeated here. In this embodiment, the first portion of the sealing chamber includes an accommodating chamber portion defined by the plunger 7 sealed to the accommodating chamber, the second portion of the sealing chamber includes an assembly gap portion enclosed between the second stem portion 42 of the valve stem 4 and the connecting seat 53, the first portion is bounded by the third sealing member 8 and the fourth sealing member 9, the second portion is bounded by the first sealing member 5 and the second sealing member 6, and the first portion is in communication with the second portion through the first through hole.

The valve body assembly 3 includes a valve body 31 and a sealing cover 32, the valve body 31 is fixedly connected to the sealing cover 32, the valve body 31 is assembled with the sealing cover 32 to form a valve body chamber 30, the valve body 31 includes a first mounting portion 311, and a first mounting chamber 312 is defined by the first mounting portion 311, part of the dynamic sealing member is located in the first mounting chamber 312, the dynamic sealing member is fixedly connected to the valve body 31, the connecting portion 43 extends into the valve body chamber 30, the valve core 2 is located in the valve body chamber 30, and the connecting portion 43 is transmissively connected with the valve core 2. Furthermore, the dynamic sealing member may be sealed to the first mounting portion 311, which is beneficial to preventing the working fluid from leaking out from the assembly gap between the first mounting portion 311 and the dynamic sealing member. Other structures of the electric valve 100 in the third embodiment are the same as those in the second embodiment, which will not be repeated here.

Referring to FIG. 11, the first sealing member 5 and the second sealing member 6 are in an X shape or a substantial X shape, so that the inner peripheral side of the first sealing member 5 forms a first contact portion and a second contact portion, the first contact portion and the second contact portion of the first sealing member 5 respectively abut against the second stem portion 42 of the valve stem 4, the outer peripheral side of the first sealing member 5 forms a third contact portion and a fourth contact portion, the third contact portion and the fourth contact portion respectively abut against the first sealing groove, the first sealing member 5 is pressed between the first sealing groove and the second stem portion via the first contact portion, the second contact portion, the third contact portion and the fourth contact portion. Similarly, the inner peripheral side of the second sealing member 6 forms a first contact portion and a second contact portion abutting against the second stem portion 42, the outer peripheral side of the second sealing member 6 forms a third contact portion and a fourth contact portion abutting against the second sealing groove, and the second sealing member 6 is pressed between the second sealing groove and the second stem portion via the first contact portion, the second contact portion, the third contact portion and the fourth contact portion. The X-shaped or substantially X-shaped first sealing member 5 and second sealing member 6 not only ensure the axial sealing of the valve stem 4, but also are beneficial to reducing a close contact area of the first sealing member 5 and the second sealing member 6 with the valve stem 4 and reducing the rotation resistance of the valve stem 4. In addition, since the electric valve 100 is used in different systems, materials of the first sealing member 5 and the second sealing member 6 may be selected according to working conditions to ensure the sealing performance of the first sealing member 5 and the second sealing member 6 under different environmental conditions, that is, the materials of the first sealing member 54 and the second sealing member 55 may be the same or different.

Figure 13:
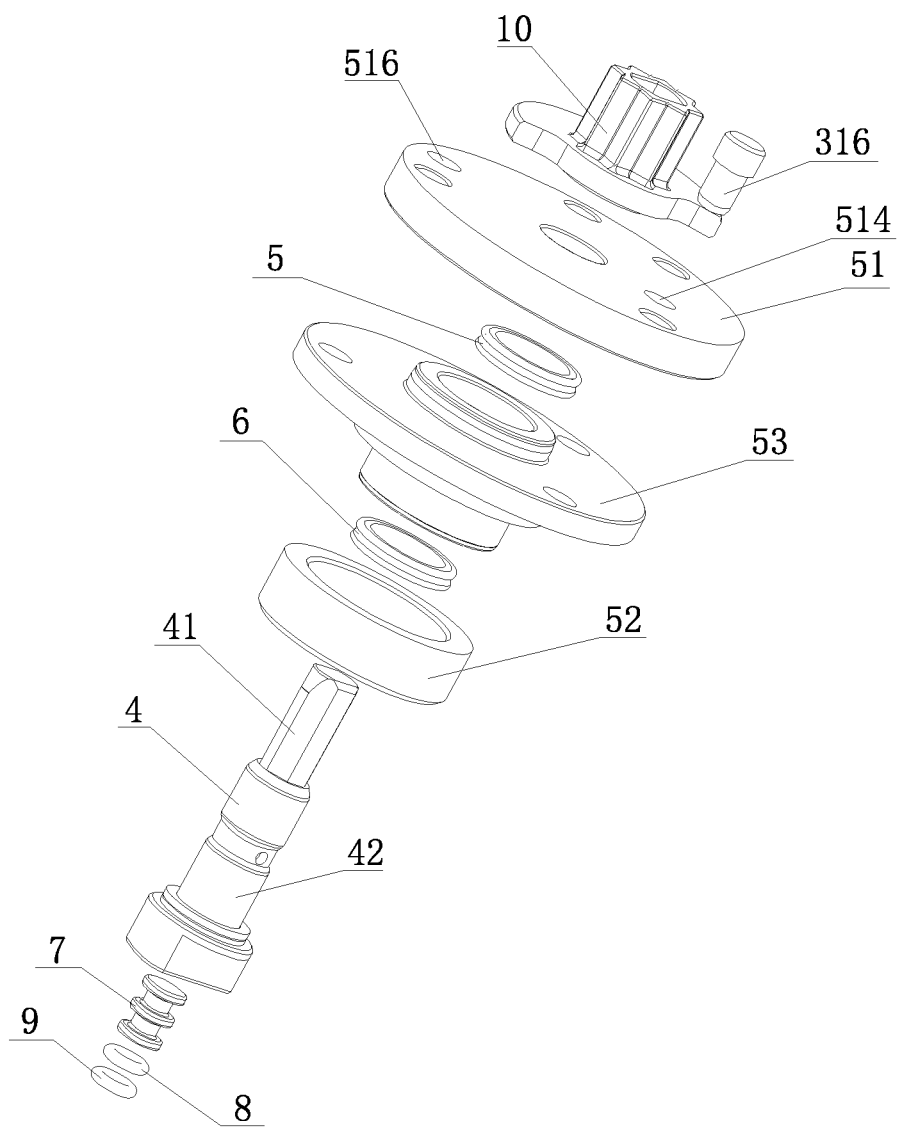
FIG. 13 is a schematic exploded view of a first assembly in FIG. 10.
Figure 14:
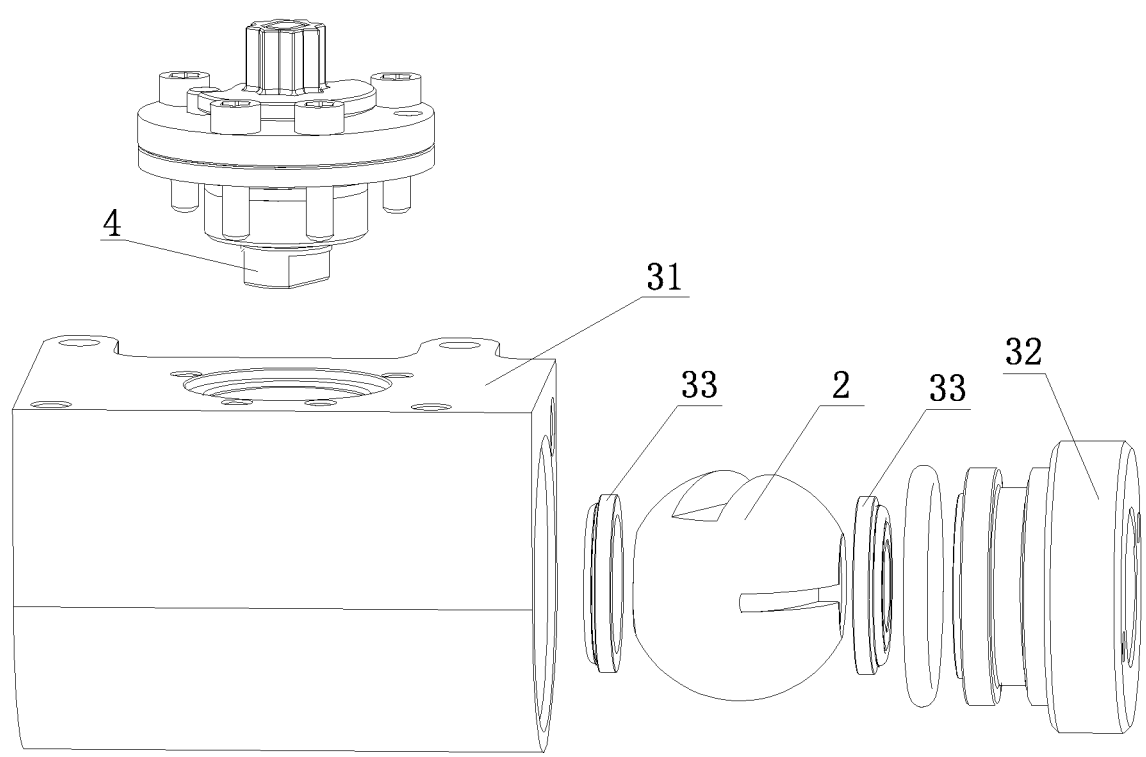
FIG. 14 is a schematic exploded view of assembling the first assembly with the valve body assembly in FIG. 10.
Figure 15:
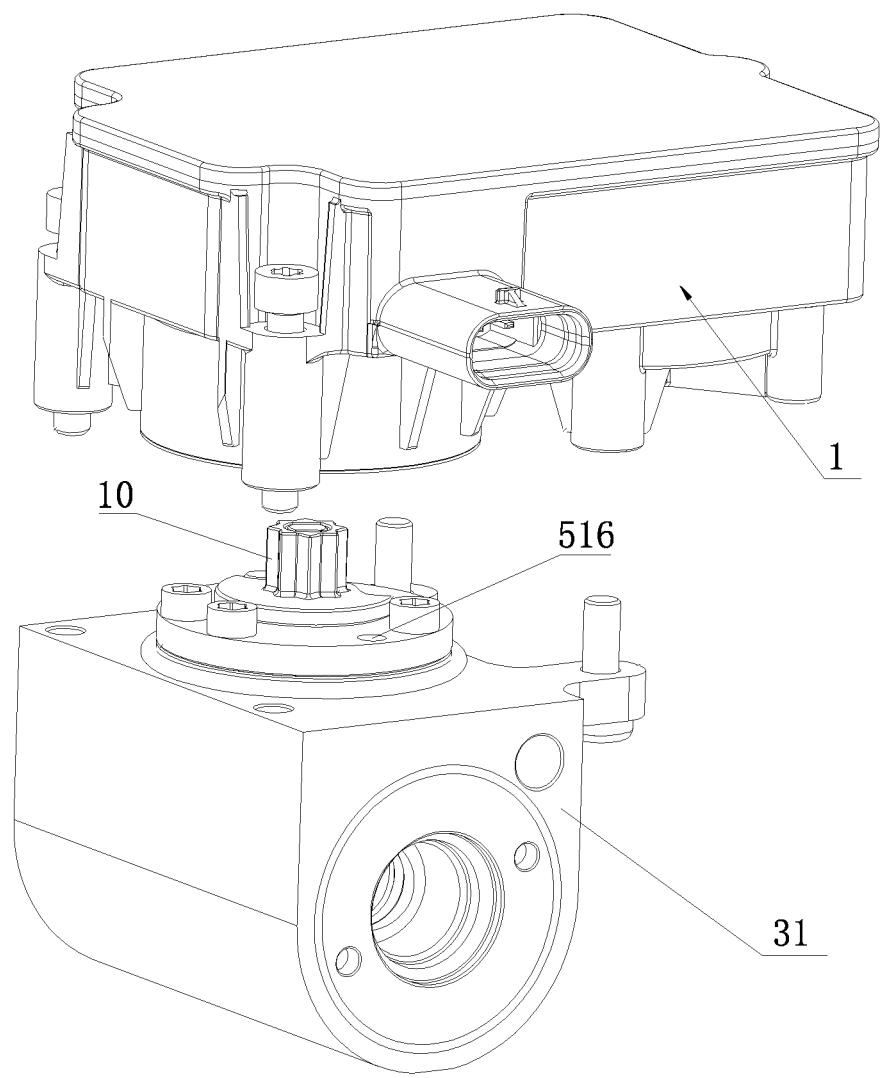
FIG. 15 is a schematic exploded view of assembling a driving member with the valve body assembly assembled with the first assembly in FIG. 10.

Referring to FIGS. 13 to 15, an assembly method of the third embodiment for the electric valve 100 is further described, and the assembly method for the electric valve 100 includes the following steps:

S1, integrally assembling the dynamic sealing member with the valve stem 4, assembling and fixing the limiting frame 10 with the valve stem 4, and assembling and fixing the limiting column 316 with the dynamic sealing member, so as to form a first assembly;

S2, connecting the first assembly to the valve body 31, and mounting the valve core seat 33 and the valve core 2 into the valve body 31 sequentially, so that the valve core 2 is transmissively connected with the valve stem 4; and then connecting the sealing cover 32 to the valve body 31; and S3, transmissively connecting the driving member 1 to the limiting frame 10, and connecting the driving member 1 to the valve body 31.

The step S1 specifically includes the following steps:
- a: arranging the first sealing member 5 in a first chamber of the connecting seat 53, arranging the second sealing member 6 in a second chamber of the connecting seat 53, and respectively press-fitting the first end cover 51 and the second end cover 52 with the connecting seat 53 assembled with the first sealing member 5 and the second sealing member 6 with interference into a whole via a tooling, so as to form a second assembly;
- b: respectively sleeving the third sealing member 8 and the fourth sealing member 9 on the outer circumference of the plunger 7 to form a plunger assembly, filling a sealing medium in the accommodating chamber of the valve stem 4, and arranging the plunger assembly in the accommodating chamber to form a third assembly;
- c: assembling the second assembly with the third assembly in the sealing medium, and pushing the third assembly to pass through the second assembly, so that the first stem portion 41 of the valve stem 4 is higher than the first end cover 51, the first sealing member 5 is pressed between the second stem portion 42 of the valve stem 4 and the connecting seat 53, and the second sealing member 6 is pressed between the second stem portion 42 of the valve stem 4 and the connecting seat 53;

d: press-fitting the limiting column 316 into the limiting hole 514 of the first end cover 51 with interference, so that the limiting column 316 is higher than the limiting hole 514; and interference-fitting and fixing the limiting frame 10 with the first stem portion 41.

The step S2 specifically includes: fixedly connecting the first assembly to the valve body 31 by a screw, and fixedly connecting the sealing cover 32 to the valve body 31 by a screw.

The step S3 specifically includes: positioning the positioning column (not shown) of the driving member 1 with the positioning hole 516 of the first end cover 51, so that the driving member 1 is positioned with the dynamic sealing member, and the driving member 1 is fixedly connected to the valve body 31 by a screw.

It should be noted that, the description of the above embodiments is only used to illustrate the present application and is not intended to limit the technical solutions of the present application, such as the definitions of "front", "rear", "left", "right", "up", and "down". Although the present application is described in detail with reference to the above embodiments, it should be understood by those skilled in the art that, various modifications or equivalent substitutions can be made to the technical solutions of the present application, and all the technical solutions and improvements without departing from the spirit and scope of the present application fall within the scope of the appended claims of the present application.

What is claimed is:

1. An assembly method for an electric valve, wherein the electric valve comprises a dynamic sealing member and a valve stem, the dynamic sealing member comprises a first end cover, a second end cover, a connecting seat, a first sealing member and a second sealing member, and the assembly method for the electric valve comprises the following steps:

arranging the first sealing member in a first chamber of the connecting seat, arranging the second sealing member in a second chamber of the connecting seat, and press-fitting and fixing the first end cover and the second end cover respectively to the connecting seat assembled with the first sealing member and the second sealing member with interference; and assembling the valve stem with the dynamic sealing member in a sealing medium, and pushing the valve stem to pass through the dynamic sealing member, so that a first stem portion of the valve stem is higher than the first end cover, the first sealing member is pressed between a second stem portion of the valve stem and the connecting seat, and the second sealing member is pressed between the second stem portion of the valve stem and the connecting seat.

2. The assembly method according to claim 1, wherein the dynamic sealing member further comprises a third sealing member, a fourth sealing member and a plunger, and the assembly method further comprises the following steps:

sleeving the third sealing member and the fourth sealing member on an outer circumference of the plunger respectively, filling the sealing medium in an accommodating chamber of the valve stem, and arranging the plunger assembled with the third sealing member and the fourth sealing member in the accommodating chamber.

3. The assembly method according to claim 2, wherein the electric valve further comprises a driving member, a valve body assembly, a valve core and a limiting frame, the valve body assembly comprises a valve body, a valve core seat and a sealing cover, and the assembly method further comprises the following steps:

connecting the dynamic sealing member assembled with the valve stem to the valve body, so that part of the valve stem is located in the valve body; mounting the valve core seat and the valve core in the valve body, so that the valve core is transmissively connected with the valve stem, and the valve core seat is located on two sides of the valve core; and connecting the sealing cover to the valve body; and interference-fitting the limiting frame with the first stem portion of the valve stem, transmissively connecting the driving member to the limiting frame, and connecting the driving member to the valve body.

4. The assembly method according to claim 3, wherein the first end cover comprises a limiting hole and a positioning hole, the electric valve comprises a limiting column, the driving member comprises a positioning column, and the assembly method further comprises the following steps:

press-fitting the limiting column into the limiting hole with interference, so that the limiting column is higher than the limiting hole; and positioning the positioning column with the positioning hole, so that the driving member is positioned with the dynamic sealing member.

5. An electric valve, comprising a valve stem, a first sealing groove, a second sealing groove, a first sealing member and a second sealing member, wherein part of the first sealing member is located in a first groove chamber formed by the first sealing groove, the first sealing member is pressed between the valve stem and the first sealing groove, part of the second sealing member is located in a second groove chamber formed by the second sealing groove, and the second sealing member is pressed between the valve stem and the second sealing groove, wherein the electric valve further comprises a plunger, the valve stem comprises an accommodating chamber and a first through hole, the first through hole extends through the valve stem, the first through hole is in communication with the accommodating chamber, at least part of the plunger is located in the accommodating chamber, the plunger is sealed to the valve stem, the first through hole is located between the first sealing member and the second sealing member, a sealing chamber is formed by the plunger, the valve stem, the first sealing groove, the second sealing groove, the first sealing member and the second sealing member, a sealing medium is filled in the sealing chamber, and part of the sealing medium is located between the first sealing member and the second sealing member.

6. The electric valve according to claim 5, wherein the valve stem comprises a first stem portion, a second stem portion and a connecting portion, the second stem portion is located between the first stem portion and the connecting portion, the first stem portion is transmissively connected with a driving member of the electric valve, and the connecting portion is transmissively connected with a valve core of the electric valve; and the first sealing groove is located on an outer circumference of the second stem portion, the second sealing groove is located on the outer circumference of the second stem portion, the first sealing member is pressed between the first sealing groove and the second stem portion, and the second sealing member is pressed between the second sealing groove and the second stem portion.

7. The electric valve according to the claim 6, wherein the first through hole is located in the second stem portion, a radial dimension of the second stem portion at the first through hole is less than a radial dimension of the second stem portion at other portions.

8. The electric valve according to the claim 7, wherein the first sealing member and the second sealing member are in an X shape or a substantial X shape, a first contact portion and a second contact portion of the first sealing member respectively abut against the second stem portion, a third contact portion and a fourth contact portion of the first sealing member respectively abut against the first sealing groove; a first contact portion and a second contact portion of the second sealing member respectively abut against the second stem portion, and a third contact portion and a fourth contact portion of the second sealing member respectively abut against the second sealing groove; and
materials of the first sealing member and the second sealing member are the same or different.

9. The electric valve according to the claim 8, wherein the valve core comprises a hole passage and a second through hole, the second through hole is in communication with the hole passage, part of working fluid flowing through the hole passage is in contact with a lower end surface of the plunger through the second through hole.

10. The electric valve according to the claim 9, wherein the electric valve further comprises a transmission member and a limiting frame, at least part of the transmission member is located in the driving member, the driving member is transmissively connected with the transmission member, the limiting frame is fixedly connected to the first stem portion, the limiting frame is transmissively connected with the transmission member, the electric valve further comprises a limiting column, the limiting frame comprises a stop portion, and the stop portion abuts against the limiting column to limit a rotation angle of the valve stem during rotation of the limiting frame.

11. The electric valve according to the claim 5, wherein the plunger comprises a third sealing groove and a fourth sealing groove, the electric valve further comprises a third sealing member and a fourth sealing member, part of the third sealing member is located in a third groove chamber formed by the third sealing groove, the third sealing member is pressed between the third sealing groove and a side wall surface forming the accommodating chamber, part of the fourth sealing member is located in a fourth groove chamber formed by the fourth sealing groove, and the fourth sealing member is pressed between the fourth sealing groove and the side wall surface forming the accommodating chamber.

12. The electric valve according to claim 11, wherein the electric valve further comprises a valve body assembly, the valve body assembly comprises a first mounting portion, the first mounting portion comprises the first sealing groove and the second sealing groove, the first sealing groove is formed by a side wall of the first mounting portion recessed inwardly, the second sealing groove is formed by the side wall of the first mounting portion recessed inwardly, and the first sealing groove is closer to an outer opening of the first mounting portion than the second sealing groove.

13. The electric valve according to the claim 12, wherein the sealing chamber comprises a first portion and a second portion, the first portion comprises an accommodating chamber portion defined by the plunger sealed to the accommodating chamber, the second portion comprises an assembly gap portion enclosed between the valve stem and the first mounting portion, the first portion is in communication with the second portion through the first through hole, the first portion is bounded by the third sealing member and the fourth sealing member, and the second portion is bounded by the first sealing member and the second sealing member.

14. The electric valve according to the claim 11, wherein the electric valve further comprises a first end cover, a second end cover and a connecting seat, the connecting seat is respectively fixedly connected to the first end cover and the second end cover, or the connecting seat, the first end cover and the second end cover are integrally processed and formed; the first sealing groove is formed by the first end cover and the connecting seat, and the second sealing groove is formed by the second end cover and the connecting seat.

15. The electric valve according to the claim 14, wherein the sealing chamber comprises a first portion and a second portion, the first portion comprises an accommodating chamber portion defined by the plunger sealed to the accommodating chamber, the second portion comprises an assembly gap portion enclosed between the valve stem and the connecting seat, the first portion is in communication with the second portion through the first through hole, the first portion is bounded by the third sealing member and the fourth sealing member, and the second portion is bounded by the first sealing member and the second sealing member.

16. The electric valve according to claim 11, wherein the valve stem comprises a first stem portion, a second stem portion and a connecting portion, the second stem portion is located between the first stem portion and the connecting portion, the first stem portion is transmissively connected with a driving member of the electric valve, and the connecting portion is transmissively connected with a valve core of the electric valve; and
the first sealing groove is located on an outer circumference of the second stem portion, the second sealing groove is located on the outer circumference of the second stem portion, the first sealing member is pressed between the first sealing groove and the second stem portion, and the second sealing member is pressed between the second sealing groove and the second stem portion.

17. The electric valve according to claim 12, wherein the valve stem comprises a first stem portion, a second stem portion and a connecting portion, the second stem portion is located between the first stem portion and the connecting portion, the first stem portion is transmissively connected with a driving member of the electric valve, and the connecting portion is transmissively connected with a valve core of the electric valve; and
the first sealing groove is located on an outer circumference of the second stem portion, the second sealing groove is located on the outer circumference of the second stem portion, the first sealing member is pressed between the first sealing groove and the second stem portion, and the second sealing member is pressed between the second sealing groove and the second stem portion.

18. The electric valve according to claim 13, wherein the valve stem comprises a first stem portion, a second stem portion and a connecting portion, the second stem portion is located between the first stem portion and the connecting portion, the first stem portion is transmissively connected with a driving member of the electric valve, and the connecting portion is transmissively connected with a valve core of the electric valve; and the first sealing groove is located on an outer circumference of the second stem portion, the second sealing groove is located on the outer circumference of the second stem portion, the first sealing member is pressed between the first sealing groove and the second stem portion, and the second sealing member is pressed between the second sealing groove and the second stem portion.

19. The electric valve according to claim 14, wherein the valve stem comprises a first stem portion, a second stem portion and a connecting portion, the second stem portion is located between the first stem portion and the connecting portion, the first stem portion is transmissively connected with a driving member of the electric valve, and the connecting portion is transmissively connected with a valve core of the electric valve; and the first sealing groove is located on an outer circumference of the second stem portion, the second sealing groove is located on the outer circumference of the second stem portion, the first sealing member is pressed between the first sealing groove and the second stem portion, and the second sealing member is pressed between the second sealing groove and the second stem portion.

20. The electric valve according to claim 15, wherein the valve stem comprises a first stem portion, a second stem portion and a connecting portion, the second stem portion is located between the first stem portion and the connecting portion, the first stem portion is transmissively connected with a driving member of the electric valve, and the connecting portion is transmissively connected with a valve core of the electric valve; and the first sealing groove is located on an outer circumference of the second stem portion, the second sealing groove is located on the outer circumference of the second stem portion, the first sealing member is pressed between the first sealing groove and the second stem portion, and the second sealing member is pressed between the second sealing groove and the second stem portion.

* * * * *